Aug. 21, 1945.   A. H. MORGAN   2,383,268
METHOD AND APPARATUS FOR REMOVING THE STEMS AND CAPS
FROM BERRIES AND SIMILAR TYPES OF FRUIT, ETC
Filed Feb. 12, 1944   2 Sheets-Sheet 1

Arthur H. Morgan
By Henry C. Parker
Attorney

Patented Aug. 21, 1945

2,383,268

UNITED STATES PATENT OFFICE 2,383,268

METHOD AND APPARATUS FOR REMOVING THE STEMS AND CAPS FROM BERRIES AND SIMILAR TYPES OF FRUIT, ETC.

Arthur H. Morgan, Knoxville, Tenn.

Application February 12, 1944, Serial No. 522,126

12 Claims. (Cl. 146—55)

This invention relates to a method and apparatus for removing the stems and caps from berries and similar types of fruit as well as various other articles in the preparation of which the invention is applicable.

An object of the invention is to utilize the inherent buoyant qualities of berries when introduced in a liquid bath to maintain effective contact with rollers by which the stems and hulls are removed.

A further object is to utilize the motion of a stream of the bath liquid to carry off the stems and caps which are removed and separated from the fruit and thereby facilitate collection and discharge of the clean fruit.

A still further object is to provide an apparatus wherein the destemming rolls are mounted to revolve with a supporting cage in conjunction with guide members by which the fruit subjected to flotation in liquid is propelled through the liquid and maintained in such close relation to the rolls as to insure nipping and removal of the stems and caps.

Figure 1:
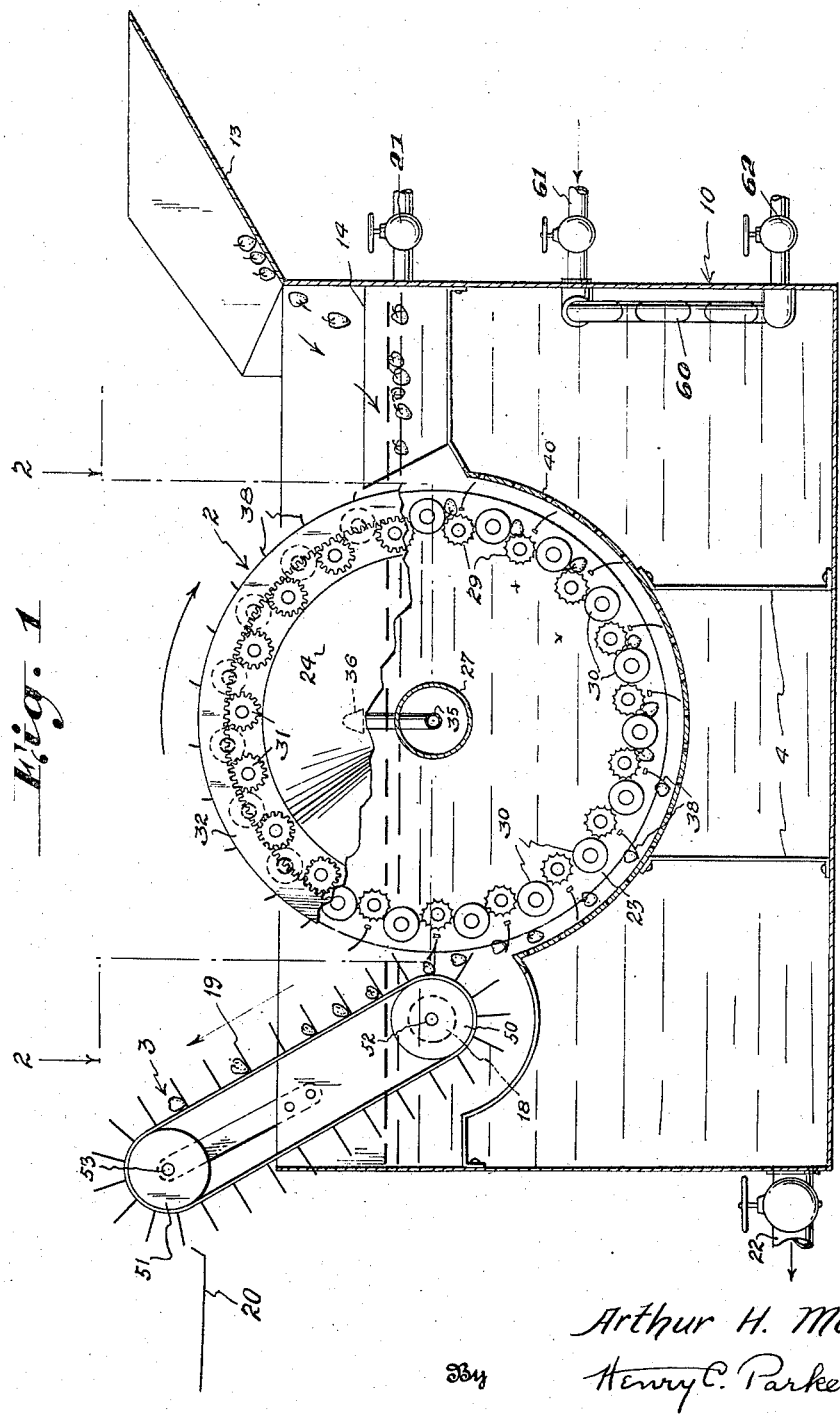
Figure 2:
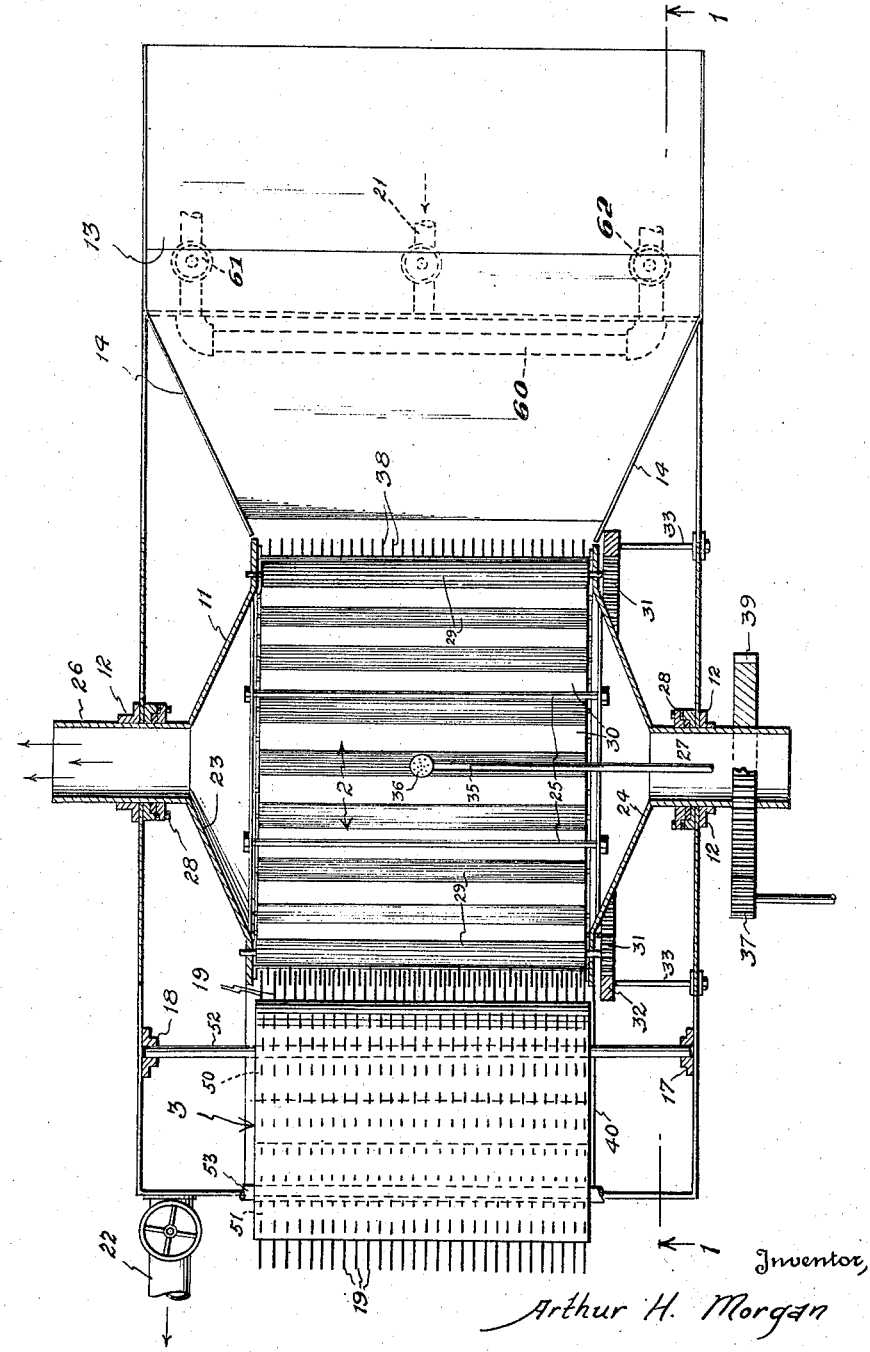

My invention can be described more accurately by reference to the accompanying drawings, which shows, more or less diagrammatically, an embodiment of an apparatus within the invention and which is useful in conducting my process. In this showing, Fig. 1 is a side elevation, taken through the tank, along the line 1—1 of Fig. 2, with parts broken away to show details, while Fig. 2 is a plan view, partly in section, taken along the line 2—2 of Fig. 1.

In this showing like parts are represented by like reference numerals. The apparatus consists of a rectangular tank 10, filled with water or other liquid, such as a salt solution, with a hopper 13 adapted to feed the berries in at one end, a central decapping cage rotatable about a horizontal axis and partly immersed in the bath liquid, shown generally at 2, an elevator, shown generally at 3, adapted to remove decapped berries at the opposite end of the tank, a perforated bottom tray 40 and lateral guides or guards 14 adapted to assist in feeding the berries to the decapping cage.

Referring to the drawings in more detail, the numeral 10 denotes a tank rotatably supporting the decapping cage 2, which is mounted in bearings 12. Feed hopper 13 is mounted at one end of the tank for receiving berries or other material for treatment. This hopper is disposed at an inclination and material moving downwardly thereon falls into the tank liquid above the bottom tray 40 and between the inwardly converging guide walls 14 which terminate adjacent the periphery of the cage 2. The opposite end of the float tank 10 accommodates an endless conveyor belt 3 supported at its upper and lower ends by rollers 51 and 50 operating on shafts 53 and 52, respectively. Lower shaft 52 operates in bearings 17 and 18 while the upper shaft may be supported in any convenient manner and may be driven by a convenient means, not shown. The conveyor belt is provided externally with rows of teeth 19 arranged in the form of a comb, having a purpose which will hereinafter appear. From the endless conveyor 3 the berries or other materials are discharged for inspection or packing at a station indicated at 20.

The cylindrical decapping cage 2 is constituted by end members 23 and 24 coupled by tie bolts 25 to provide a rigid frame like structure. The end members are of substantially conical form arranged with the concave surfaces facing inwardly and having axial hollow extensions or journals 26 and 27 operating in the bearings 12. The insure against leakage, packing glands 28 are arranged about the journals 26 and 27 and, during the operation of the machine, these latter constitute passages for the discharge of surplus water and also the caps and stems removed from the material undergoing treatment.

Water or other liquid is admitted to the tank by pipe 21 for cleaning and floating the material undergoing treatment and for carrying off the removed caps and stems. At the end of the tank, opposite the pipe 21, a bottom clean-out connection 22 is provided. If desired, a water pipe 35 can be passed through one of the hollow journals of the decapping cage and provided with a spray nozzle 36 to wash any adhering caps from the rolls. The water introduced in this manner can be discharged through one of the journals.

The end members 23 and 24 of the decapping cage are spaced a distance apart approximately corresponding with the narrow inner side of the bottom tray 40 and a series of spaced parellel fluted rolls 29 is rotatably mounted in the external rim portions of the end members. A circular series of rubber rolls 30, preferably provided with smooth external surfaces, are arranged between the fluted rolls 29, the diameter of the circle of the series of rubber rolls 30 being somewhat greater than the diameter of the circular series of fluted rolls 29. Both series of rolls can be journaled in the end members of the cage as shown, although it is possible to support the rubber covered rolls by means of spiral springs which hold these rolls resiliently against the fluted rolls, as described more fully in my patent, Number 2,323,668.

The shafts of the fluted rolls 29 project through and beyond the end members 23 and 24 of the rotatable cage and are provided with pinions 31 meshing with the teeth of an internal ring gear 32 held stationary by supporting members 33 secured to the adjacent side wall of the tank 10. In this manner the fluted rolls are positively driven while the smooth rubber rolls can be driven by friction, from the fluted rolls.

The hollow supporting journal 27 at one end of the rotatable cage is provided with a gear 36 meshing with a drive pinion 37 by means of which rotary motion is imparted to the cage and, in consequence of the driving connection between the pinions 31 and the ring gear 32, rotary motion is positively transmitted to the fluted rolls 29.

Rows of radially projecting propelling teeth or fingers 38 formed of relatively short lengths of wire mounted in comb formation extend between the end members 23 and 24 and are disposed in such relation to the rolls 29 and 30 that the berries or other articles undergoing treatment are propelled and maintained in the most effective position to insure the removal of the caps and stems. The cylindrical cage is intended to revolve in the direction indicated by the arrow on the drawings and the outer extremities of the comb teeth 38 are slightly curved forwardly in the direction of rotation. The comb teeth 28 intermesh with the comb teeth 19 of the discharge conveyor.

A perforated bottom tray 40 extends from a point below the hopper 13 to a point below the discharge conveyor 3. The portion of the bottom tray 40 lying directly below the rotating cage 2 is spaced and curved concentrically therewith in such manner that the outer extremities of the comb teeth 38 avoid actual contact. The portion of the bottom tray 40 underlying the lower extremity of the endless conveyor 3 is also curved in conformity with the general shape of the lower end of said conveyor. This bottom tray is secured to the tank wall at both ends and supported in the center by brackets 4.

In operation, water is first admitted to the tank 10 through the supply pipe 21 and is normally maintained at a fairly constant temperature by the refrigerating (or heating) coil 60. The water is maintained at the level indicated in the drawings by wash water introduced through spray nozzle 36. The water level is usually maintained above the axis of rotation of the rotatable edge. Consequently, the excess water entering the tank discharges through the hollow extensions 26 and 27 carrying therewith the hulls, stems and other parts of the material undergoing treatment which is desired to remove. Rotary motion is imparted to the cage by the driving pinion 37 and, due to the engagement of the pinions 31 with the ring gear 32, the rolls are rotated in the revolving cage. The inclined conveyor 3 is driven in such manner that the comb teeth 19 thereof entering between the comb teeth 38 remove the decapped and destemmed material and carry it upwardly to an inspection station, for example.

The berries to be decapped are introduced into the liquid bath and this causes them to spread out into a single layer. This layer of berries enters the space between the tray 40 and the outer extremities of the comb teeth 38 revolving with the cage 2. Consequently, as each row of teeth 38 descends below the surface of the liquid in the tank 10, a group of berries or other articles are carried downwardly, and moved through the liquid. In so doing, the articles move upwardly partly due to the guiding influence of the curved extremities of the teeth 38 and partly due to the buoyant nature of the berries or like material undergoing treatment.

During the rotary movement of the cage, the berries are propelled through the liquid and during this movement they contact the rolls 29 and 30 in such manner that the stems and hulls are pinched off and removed. In this manner the hulls and stems move between the rolls, assisted by the flow of water, and enter the interior of the cage from which they are discharged through the hollow extensions 26 and 27. The destemmed berries continue to move with the cage under the guiding and propelling influence of the comb teeth 38 until they are caught and lifted out of the liquid bath by the comb teeth 19 and deposited at any suitable point.

While I have described what I consider to be the most advantageous embodiments of my invention, it is evident, of course, that various modifications may be made in the specific structures described without departing from the purview of this invention. While I have described the invention as directed to the decapping of berries, it is evident that other fruit can be destemmed by my apparatus; with larger fruit, such as pears, for example, it is necessary to increase the size of the rolls to correspond. With small berries, such as huckleberries, it may be necessary to decrease the size of the rolls. For strawberries the diameters of the rolls should be approximately 3/8 inch. The cage can be rotated at a speed of from about 10 to 50 R. P. M. A convenient size of cage is one having a diameter of about 12 to 18 inches and a length of about 20 inches.

It will be noted that the liquid bath exerts a constant but rather small force, due to the buoyancy of the fruit, causing the fruit to press gently against the decapping rolls. This is a new result in the art. This force can be varied by changing the specific gravity of the bath liquid, by the addition of salt or glycerine, for example. Fruit which normally tends to sink in water can be made to float by such additions. The liquid also assists in spreading out the fruit and separating it into a single layer at the point of contact between the fruit and the rotating cage. Owing to these actions of the bath liquid the injury to the fruit during the decapping operation is reduced to a minimum.

If desired the decapping rolls may both be made fluted or of resilient material. They may be covered with rubber, cloth or other flexible, water-resistant material. It is not necessary to employ a conveyor to remove the decapped fruit from the tank, since a hand scoop or other means can be employed for this purpose. It is also possible to dispense with the collecting teeth 38 on the decapping cage since the rotation of this cage tends to drag the fruit along in contact therewith. Other modifications of my invention, which fall within the scope of the following claims will be immediately evident to those skilled in this art.

What I claim is:

1. In the destemming of fruit and the like wherein a tank is employed containing a liquid in which the fruit tends to float and a rotating destemming cylinder is supported in the tank partly immersed in the liquid and with its axis mounted substantially horizontally, the process which comprises introducing fruit to be destemmed into the liquid on the side of said rotating cylinder which is rotating downwardly into the liquid, causing the fruit to contact the cylinder and to pass circumferentially and underneath it to the opposite discharging side thereof, removing the stems while the fruit is being held in contact with said cylinder by its tendency to float and removing the destemmed fruit from the liquid on the discharging side of said cylinder.

2. In the destemming of fruit and the like, the process which comprises introducing fruit to be destemmed into a bath in which it tends to float, passing the fruit under the surface of said bath and underneath and in contact with a destemming device and removing the stems while the fruit is being held against said device by its tendency to float.

3. An apparatus for destemming fruit which comprises a tank containing a liquid in which the fruit tends to float, a plurality of destemming rolls mounted in said tank beneath the surface of the liquid with their axes substantially horizontal, means for passing fruit to be destemmed beneath the surface of the liquid and beneath and in contact with said destemming rolls, whereby the fruit is held against the rolls by its tendency to float, and means for rotating the rolls to destem said fruit.

4. An apparatus for determining fruit and the like which comprises a tank containing a liquid bath in which the fruit tends to float, a cage rotatably mounted in said tank, a plurality of rotatable destemming rolls mounted with their axes substantially horizontal around the periphery of said cage in such fashion that as the cage is rotated the rolls are passed beneath the surface of the liquid tending to drag the fruit beneath said rolls on one side of the cage and to discharge it on the other side, means for introducing fruit to be destemmed into the liquid bath on the first mentioned side of said cage, means for removing destemmed fruit from the other side of said cage, and means for rotating the cage and said rolls.

5. An apparatus for destemming fruit and the like which comprises a tank containing a liquid bath in which the fruit tends to float, a cage rotatably mounted in said tank, a plurality of rotatable destemming rolls mounted with their axes substantially horizontal around the periphery of said cage in such fashion that as the cage is rotated the rolls are passed beneath the surface of the liquid and tend to drag the fruit beneath said rolls on one side of the cage and to discharge it on the other side and means for passing water through said cage to wash stems and caps removed by the rolls out of the cage.

6. An apparatus as claimed in claim 3 provided with a rotatable cage supporting said rolls for movement through the body of liquid, and means carried by said cage for propelling the fruit through the liquid and maintaining said fruit in proximity to the rolls.

7. An apparatus as claimed in claim 3 provided with a rotatable cage supporting said rolls for movement through the body of liquid, means carried by said cage for propelling the fruit through the liquid and maintaining said fruit in proximity to the rolls, and a discharge conveyor partially immersed in the liquid and arranged to remove the fruit from said guide means and said liquid.

8. An apparatus as claimed in claim 3 provided with a rotatable cage supporting said rolls for movement through the body of liquid, means carried by said cage for propelling the fruit through the liquid and maintaining said fruit in proximity to the rolls, a discharge conveyor partially immersed in the liquid and arranged to remove the fruit from said propelling means and said liquid, and means for facilitating the introduction of fruit into said liquid at a point remote from said discharge means.

9. An apparatus as claimed in claim 5 provided with means for introducing of fruit into the liquid, and means revolving with the cage for propelling the fruit through the liquid and maintaining said fruit in proximity to said rolls during passage through the liquid.

10. An apparatus as claimed in claim 5 provided with means carried by the cage for propelling fruit through the liquid and maintaining the fruit in proximity to said rolls, and means for removing fruit from said propelling means and conveying fruit from said tank.

11. An apparatus as claimed in claim 5 provided with tooth-like members carried by the cage for propelling fruit through the liquid, means for introducing fruit into the liquid at one side of the cage, means for removing fruit from the liquid located at the opposite side of the cage.

12. An apparatus as claimed in claim 5 provided with tooth-like members carried by the cage for propelling fruit through the liquid, means for introducing fruit into the liquid at one side of the cage, means for removing fruit from the liquid located at the opposite side of the cage, and a perforate wall in the tank underlying said cage.

ARTHUR H. MORGAN.